United States Patent [19]

Reis et al.

[11] Patent Number: 5,030,949

[45] Date of Patent: Jul. 9, 1991

[54] PROCESS AND APPARATUS FOR INFLUENCING A CENTRAL LOCKING SYSTEM IN A MOTOR VEHICLE TO EFFECT SEPARATE RELEASE OF A CLOSURE OR THE CENTRAL LOCKING SYSTEMS

[75] Inventors: Tobias Reis, Aidlingen; Wolfgang Schneider, Gartenstrasse; Günther Weikert, Weil der Stadt, all of Fed. Rep. of Germany

[73] Assignee: Daimler-Benz Aktiengesellschaft, Stuttgart, Fed. Rep. of Germany

[21] Appl. No.: 404,071

[22] Filed: Sep. 7, 1989

[30] Foreign Application Priority Data

Sep. 8, 1988 [DE] Fed. Rep. of Germany ....... 3830511

[51] Int. Cl.[5] ......................... H04B 1/00; E05B 65/36

[52] U.S. Cl. ................................ 340/825.65; 70/264; 180/287

[58] Field of Search .................. 340/426, 430, 825.31, 340/825.57, 825.65, 825.66; 180/287; 123/198 B; 307/10.1, 10.2, 10.5; 70/237, 238, 239, 264, 256; 328/72, 74

[56] References Cited

U.S. PATENT DOCUMENTS

| | | | |
|---|---|---|---|
| 3,030,794 | 4/1962 | Dyer et al. | 70/264 |
| 3,653,237 | 4/1972 | DuRocher | 70/264 |
| 3,747,379 | 7/1973 | Cabanes | 70/264 |
| 4,342,209 | 8/1982 | Kleefeldt | 70/264 |
| 4,805,427 | 2/1989 | Bates et al. | 70/264 |
| 4,887,065 | 12/1989 | Robitschko et al. | 70/264 |

FOREIGN PATENT DOCUMENTS

| | | |
|---|---|---|
| 2931136 | 2/1981 | Fed. Rep. of Germany . |
| 3113893 | 10/1982 | Fed. Rep. of Germany . |
| 3136468 | 3/1983 | Fed. Rep. of Germany . |
| 3531349 | 7/1986 | Fed. Rep. of Germany . |

*Primary Examiner*—Donald J. Yusko
*Assistant Examiner*—Dervis Magistre
*Attorney, Agent, or Firm*—Evenson, Wands, Edwards, Lenahan & McKeown

[57] ABSTRACT

A process and apparatus for influencing a central locking system (CLS) in a motor vehicle wherein a separate release of a driver-door closure is provided and wherein, without special preselection measures in the vehicle interior, a vehicle user can, during each release at the locking station assigned to this closure, decide whether he wants to release only this one closure separately, by actuating the corresponding locking station once, or whether he wants to release the closures of the vehicle centrally, by actuating this locking station twice.

14 Claims, 1 Drawing Sheet

PROCESS AND APPARATUS FOR INFLUENCING A CENTRAL LOCKING SYSTEM IN A MOTOR VEHICLE TO EFFECT SEPARATE RELEASE OF A CLOSURE OR THE CENTRAL LOCKING SYSTEMS

BACKGROUND AND SUMMARY OF THE INVENTION

The invention relates to a process and apparatus for the separate release of a closure in a motor vehicle with a central locking system, wherein a central control circuit of the central locking system is activatable from a locking station assigned to the individual closure at least for its direct release and to effect indirect release or locking of further closures through release or locking control signals generated during the actuation of this locking station in a releasing or a locking direction through an electrical switch means coupled to this locking station A process with these general features can be derived from the influencing of a central locking system (hereafter referred to as CLS) according to German Offenlegungsschrift 3,612,306.

There, an electrical switch in the passenger space of the vehicle can be activated electrically in the blocking direction by a solenoid valve inserted in a dual-pressure line leading to a line distributor. The blocking solenoid valve prevents actuating elements, connected to the line distributor via fluid lines, from being subjected to a releasing pressure. At any time, it is possible to subject those actuating elements assigned to the closures of the passenger and rear doors, to a locking vacuum via a non-return valve connected in parallel with the solenoid valve With the solenoid valve closed, i.e. with the electrical switch closed and the magnet winding live, only the driver-door closure is released in response to a corresponding actuation of its lock cylinder. The remaining closures remain locked because the actuating elements assigned to them cannot be subjected to pressure, even though a CLS control signal is generated by a control switch assigned to the driver-door closure.

German Offenlegungsschrift 2,931,136 provides electrical switches arranged in the passenger space of a vehicle that can only be cancelled during release, or during release and locking, so that only an individual release or individual locking of all the closures is possible.

These two systems are inconvenient in that the electrical switches allowing the individual release of a particular closure can be actuated only from the interior. The vehicle user therefore has to decide, before leaving the vehicle, whether next time he gets in, he wishes to or has to release all the closures centrally, or only the driver-door closure.

The object of the invention is to develop a CLS in such a way that a choice between a central release of all the closures or only a direct release of one closure from the same locking station can be made, each time the vehicle is unlocked from outside, and to provide at least one central locking system which is suitable for carrying out this process.

In the CLS having a central control circuit the central locking system is activatable from a locking station assigned to the individual closure at least for its direct release and to effect indirect release, or locking of further closures, through release or locking control signals generated during the actuation of this locking station in a releasing or a locking direction through an electrical switch means coupled to this locking station. This object is achieved when the locking station is actuated once in the releasing direction by having only the associated closure directly released and no release control signal is generated for the other closures. When the locking station is actuated several times within a predetermined time interval, the central control circuit is activated in the releasing direction to release all of the closures.

A central locking system having a central control circuit for the operation of closure actuating elements both in a releasing and a locking direction for carrying out the above process comprises a central control circuit, which is activatable at least indirectly by locking and release control signals at the one locking station assigned to the drivers closure, at least for its direct release through a first switch means coupled to this locking station As a result of the actuation of the switch in a releasing or locking direction an electrical potential is connected to a control line for operating the closure actuating elements. A second switch means is coupled to the locking station and switched at least whenever the latter is actuated in a releasing direction. A pulse counter is connected to the second switch means and a logic module is connected to the pulse counter, and is inserted in a control line between the first switch means and the central control circuit. The pulse counter transmits an output signal activating the logic module for the transmission of a release control signal to the central control circuit via the control line only in response to a number of switch signals of the second switch means and only if the signals are generated within a time interval predetermined by the said pulse counter. The logic module transmits a locking control signal (with a polarity opposite the polarity of the release control signal) to the central control circuit via the control line as early as a response to a switch signal of the first switch means is generated, when the locking station is actuated once in a locking direction.

Another structure for carrying out the process has the central control circuit activatable at least indirectly by locking or release control signals (at the one locking station assigned to a specific closure) via a switch means coupled to this locking station and co-actuated during each actuation of the locking station in both a releasing and a locking direction. The switch, via a respective control line, can be subjected to an electrical potential according to the direction of actuation of the switch means for operation of the closure actuating elements. Here the switch is coupled to the locking station and to the pulse counter, provided in a control line subjected to an electrical potential, when the locking station or the switch means is actuated in the releasing direction. The pulse counter counts switch signals of the switch means occurring in the control line and transmits a release control signal to the central control circuit via the control line only in response to a number of switch signals of the switch means, if generated within a time interval predetermined in the said pulse counter.

The invention makes use of the fact that the closure assigned directly to a particular locking station, formed by a mechanical lock cylinder, can always be released and locked mechanically from this locking station. The set object is achieved because a CLS control signal is generated in the releasing direction only when this locking station is actuated several times, even though the switch means provided for this station are switched during each actuation of the locking station.

It is known (German Patent Specification 3,113,893 and German Offenlegungsschrift 3,136,468) to prevent needless energy consumption by switching on an electrical door-lock heating unit only when the door-lock outer handle (pull handle, push button, etc.) is actuated twice within a predetermined time interval. These publications do not give information on a procedure according to the invention for the influencing of a CLS.

It is advantageous if the predetermined time interval is defined by the first generation of the switch signal and if the switch signals are detected and counted by a counting device inserted between the switch means generating them and the central control circuit. Additionally, the counting device after reaching a predetermined number of switch signals will generate the release control signal at least indirectly. Also, the counting device is reset to an initial state both after the expiration of the predetermined time interval and also upon generation of a locking control signal from a switch actuated during the time interval in a locking direction and during the actuation of the locking station.

Control principles are known from German Offenlegungsschrift 3,612,306 and from German Patent Specification 3,531,349. They differ from one another purely outwardly in the number of electrical control lines leading from the switch means in the locking stations to the particular central control circuit. In the first German patent there are two lines which, depending on the direction of actuation of the switch means, that can be subjected alternately to a constant electrical potential and are potential-free in the state of rest. In the second German specification, only one control line leads from each locking-station switch means to the central control circuit, and this control line can be subjected alternately to a positive and negative electrical potential. The second-mentioned German Patent Specification also discloses second switch means which are assigned to the particular locking station and whenever this is actuated by a master key, the locks are co-actuated and play an important part in the CLS. Nevertheless, no information on a function according to the instant invention of the CLS can be found even in the second-mentioned German Patent Specification.

In Applicant's device it is advantageous if there is a timing circuit which is triggerable by the first switch signal of the switch means, which is connected to the pulse counter via a counting input, and which presets the time interval in the pulse counter. Also advantageous is the fact that the pulse counter has a reset input connected to the switch means and switchable by the locking station during the actuation of the latter in the locking direction. Here, when the locking station is actuated in the locking direction, the pulse counter is reset to an initial state. Also after the expiration of the time interval, the timing circuit generates a signal resetting the pulse counter to an initial state.

Other objects, advantages and novel features of the present invention will become apparent from the following detailed description of the invention when considered in conjunction with the accompanying drawings.

DETAILED DESCRIPTION OF THE DRAWINGS

Figure 1:
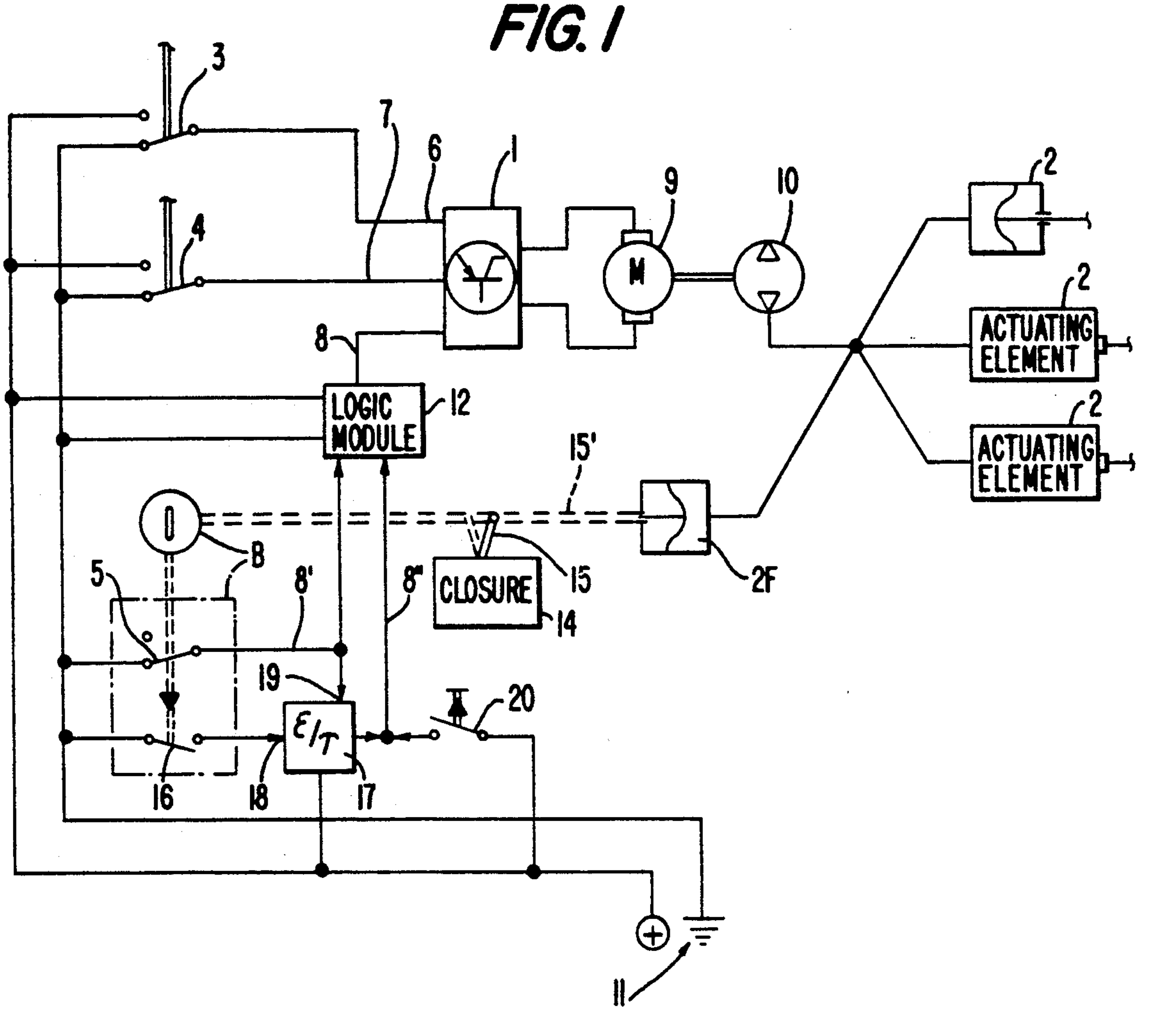
FIG. 1 shows a schematic circuit for a CLS with a first control principle.

Incorporated in a motor vehicle (not shown) is a CLS which is composed essentially of a central control circuit 1, actuating elements 2 and 2F (here designed as pneumatic single-chamber dual-pressure elements) and first switch means 3, 4 and 5.

The central control circuit 1 is activated via three individual control lines 6, 7 and 8 and operates the actuating elements 2 and 2F indirectly by means of a dual-pressure pump 10 driven in both direction by a reversibly driven electric motor 9.

The first switch means 3, 4 and 5 are designed as bistable change-over switches. The movable contacts or the change-over switches 3 and 4 are connected to respective control line 6 and 7. The two fixed contacts of the change-over switches 3 and 4 are connected respectively to opposite potentials of a voltage source 11. By means of these change-over switches, direct activation of the central control circuit 1 by means of a potential change on at least one of the control lines 6 or 7 is obtained. The position of the change-over switches corresponds respectively to the position of an associated closure as a result of a mechanical coupling, i.e. "released" or "locked". In a known way, the change-over switches can be integrated into the actuating elements 2 assigned to the particular closures. During the release or locking of the closures (not shown) on the passenger door and boot lid, the central control circuit 1 is therefore activated directly.

The control line 8 connects a logic module 12 to the central control circuit 1.

The first switch means 5 is assigned to a driver-door locking station 13 for direct release and locking of a driver-door closure 14, like the actuating member of the actuating element 2F. Switch 5 is connected mechanically to a latch lever 15 of the closure 14 via a linkage 15' or the like. The movable contact of the change-over switch 5 is connected to the logic module 12 via a part control line 8'. Only one of its fixed contacts is connected to the negative potential of the voltage source 11, the other fixed contact being potential-free.

Furthermore, a second switch means 16, in the form of a single-pole make relay, is assigned to the locking station 13. While the bistable change-over switch 5 assumes its position according to the position of the closure 14 to connect control line 8' either to negative potential or to a potential-free pole, during each actuation of the locking station 13 (formed by a lock cylinder (details not shown)), the make relay 16 feeds the negative potential of the voltage source 11 to a pulse counter 17 via a counter input 18.

The pulse counter 17 is connected to the part control line 8' by means of a reset input 19. An output signal from the pulse counter 17 is also fed to the logic module 12 via a second part control line 8". This second part control line 8" is also connected to the positive side of voltage source 11 through interior release button 20, arranged in the passenger space of the vehicle.

Starting from the locked state of all the closures and with switches 5 and 16 in the position shown, the user can first release the driver-door closure 14 mechanically in the usual way by actuating the locking station 13 once in the releasing direction. For this, there is also no need for him to distinguish between different key pivoting angles. The latch lever 15 is thereby drawn via the linkage 15' into its release position represented by broken lines and the change-over switch 5 is changed over to its potential-free fixed contact. The make relay 16 designed as a lock-cylinder microswitch is actuated once during the forward and return rotation of the lock cylinder. The make relay 16 is closed, for example, by means of a cam on the lock cylinder, immediately after rotation out of its neutral key insertion and removal position and remains closed until the lock cylinder virtually assumes this position once again. A first switch signal of the make relay 16 is then fed to the pulse counter 17 via the counter input 18.

The central control circuit 1 is not activated, and thus the other closures remain locked.

By means of the first switch signal of the make relay 16, which is still present at the counter input 18 when the reset input 19 is already potential-free, a timing circuit defining a specific time interval, for example 5 seconds, is triggered internally in the pulse counter 17 identified by a sum symbol (Σ) and a time constant symbol (T).

If a further switch signal of the make relay 16, generated as a result of the renewed actuation of the locking station 13 in the releasing direction, also reaches the counter input 18 within this time interval, the pulse counter 17 transmits a signal to the logic module 12 via the second part control line 8'. Only here, this second input to the pulse counter 17 is converted to a signal of the logic module 12 which converts this latter signal into a release control signal which it transmits to the central control circuit 1 via the control line 8. This release signal corresponds to the release control signals which can be generated directly by means of the change-over switches 3 or 4.

A switch signal for the interior release button 20 is also processed similarly in the logic module. When the locking station 13 is actuated several times in the releasing direction within the time interval, or the interior release button 20 is actuated once, the central control circuit 1 can therefore be activated for the central release of all the closures equipped with actuating elements.

If no second switch signal from the make relay 16 is applied to the counter input 18 within the time interval, at the expiry of this interval, there is an automatic resetting of the pulse counter 17 without a resulting output signal from the timing circuit. If, after the first expiry of the time interval, all the closures are nevertheless still to be released centrally from the driver-door locking station, the corresponding release control signal can be generated indirectly by actuating the locking station 13 in the releasing direction twice in quick succession.

A restart of the time interval also occurs when a switch signal of the change-over switch 5 (from "potential-free" to "negative potential") is applied to the reset input 19 via the part control line 8' in the course of its duration.

In the logic module 12, this switch signal is converted into a locking control signal on the control line 8 and a corresponding activation of the central control circuit 1 for the central locking of all the closures equipped with actuating elements 2 and 2F.

The pulse counter 17 is reset to its initial state by means of this same switch signal.

It is plainly evident that no change has to be made on the central control circuit 1 for the additional function "separate release of the driver-door closure", because its input control signals—the potential changes on the control lines 6, 7 and 8—can be maintained. The manipulation of the CLS also remains largely unchanged and therefore user-friendly. For instructions regarding the additional function, only a brief reference is required in the operating manual of the vehicle, because the additional function is per se easy to put into practice.

Of course, the additional function can also be used simultaneously at several locking stations in the illustrated CLS with multiple-station operation.

Figure 2:
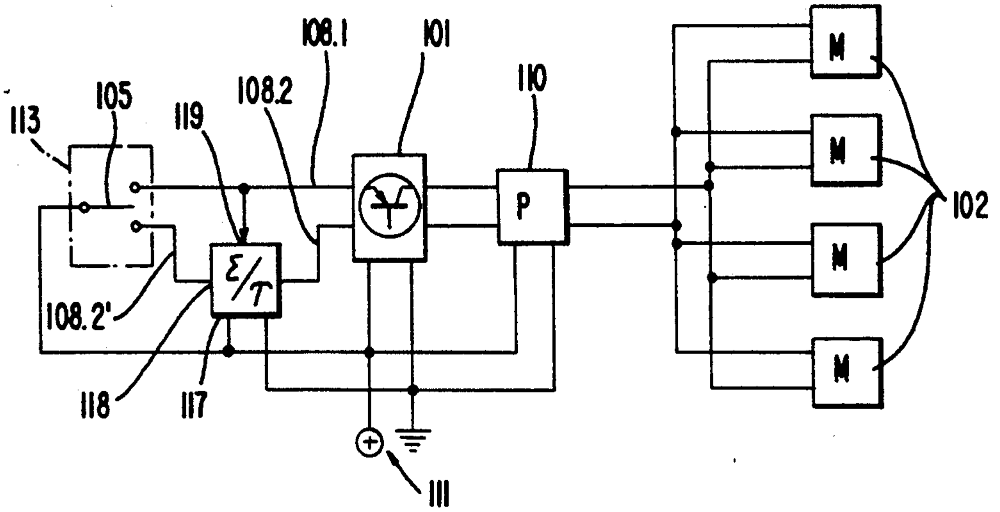
FIG. 2 shows a schematic circuit for a CLS with a second control principle.

FIG. 2 shows that the control principle of the CLS is not critical for the use of the additional function according to the invention.

In FIG. 2, the reference numerals are in the hundreds and with a corresponding last digit to FIG. 1, in order to make clear distinctions between elements of the two Figures and to indicate equivalencies between elements of an identical function. Thus, the central control circuit 1 (FIG. 1) and central control circuit 101 (FIG. 2), the locking station switch means 5 (FIG. 1) and 105 (FIG. 2) and the actuating elements 2 (FIG. 1) and 102 (FIG. 2), etc. correspond functionally to one another. The representation of mechanical interconnections was omitted in FIG. 2, since essential electrical functions are important here.

Here the central control circuit 101 drives reversible electrical actuating elements 102 in the locking or releasing direction via a power stage 110. For this, it is activatable via at least two control lines 108.1 and 108.2. Line 108.1 is intended for transmitting a locking control signal from a switch means 105. The switch means 105 is designed as a change-over switch with a neutral mid-position and is connected by means of its movable contact to the positive potential of the vehicle voltage source 111. It is also connected mechanically to a locking station 113 (indicated merely by dot-and-dash lines). Via this locking station, the movable contact 105 can be switched alternately to the first control line 108.1 or to a part 108.2' of control line 108.2.

In the first case, the central control circuit 101 is activated directly in order to operate the actuating elements 102 in the locking direction.

In the second case, with the same cycle as already described with reference to FIG. 1, a timing circuit defining a specific time interval is triggered in the pulse counter 117 during the mechanical release of the closure assigned to the locking station.

If a further switch signal arrives via the part 108.2' of control line 108.2 within this time interval, the pulse counter 117 transmits a release control signal via the control line 108.2 to the central control circuit 101 which thereupon operates the actuating elements 102 in the releasing direction and releases all the closures centrally. If no second switch signal arrives during the time interval, the pulse counter is automatically reset. If a switch signal arrives via the control line 108.1 the reset input 119 causes the time interval of the pulse counter 117 to be reset.

In the two CLS's illustrated, it is of course, directly possible to integrate the switch elements, that is to say the pulse counter and, if appropriate, the logic module, which allow the separate release of a closure, into the respective central control circuit 1 or 101. This becomes especially simple if the central control circuit has a programmable microprocessor.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Process for use with a central locking system having a central control circuit in a motor vehicle to effect a separate release of a single closure from a locking station assigned to the single closure and to effect indirect release and locking of additional closures operatively associated with the central control circuit by respective release and locking control signals generated during the actuation of the locking station in a respective releasing and a locking direction by a switch operatively coupled to this locking station, comprising the steps of directly releasing only the single closure when the locking station is actuated once in the releasing direction without generating a release control signal for the additional closures; and only when the locking station is actuated at least twice within a predetermined time interval and in the releasing direction, activating the central control circuit to produce the release control signal by virtue of a corresponding number of switch signals of the switch being actuated each time during the actuation of the locking station.

2. Process according to claim 1, wherein a start of the predetermined time interval is defined by actuation of the switch.

3. Process according to claim 1, wherein the number of switch signals are detected and counted by a counting device inserted between the switch generating the switch signal and the central control circuit; and wherein the counting device, after reaching a predetermined number of switch signals, generates the release control signal.

4. Process according to claim 2, wherein the number of switch signals are detected and counted by a counting device inserted between the switch generating the switch signal and the central control circuit; and wherein the counting device, after reaching a predetermined number of switch signals, generates the release control signal.

5. Process according to claim 3, wherein the counting device is reset to an initial state both after the expiration of the predetermined time interval and upon generation of a locking control signal from the switch actuated in a locking direction during the actuation of the locking station during the time interval.

6. Process according to claim 4, wherein the counting device is reset to an initial state both after the expiration of the predetermined time interval and upon generation of a locking control signal from the switch actuated in a locking direction during the actuation of the locking station, during the time interval.

7. A central locking system with a central control circuit for the operation of closure actuating elements both in a releasing and a locking direction, wherein the central control circuit is activated by locking and release control signals from one locking station assigned to a specific closure for its direct release by a first switch means coupled to this locking station;

said control circuit subject to an electrical potential through control line means for operating the closure actuating elements as a result of the actuation of the first switch means into releasing or locking switch positions;

a second switch means coupled to the locking station and switched at least whenever the latter is actuated in a releasing direction;

a pulse counter connected to the second switch means to receive signals therefrom every time the second switch means is actuated;

a logic module connected to the pulse counter and inserted in the control line which is connected between the first switch means and the central control circuit;

the pulse counter transmitting an output signal to the logic module activating the logic module to permit transmission of a release control signal from the second switch means to the central control circuit via the control line, only when the pulse counter receives a number of switch signals from the second switch means and these signals are generated within a time interval predetermined in said pulse counter; and the logic module transmitting a locking control signal with a polarity opposite a polarity of a release control signal via the control line to the central control circuit in response to a switch signal of the first switch means when the locking station is actuated once in a locking direction.

8. Central locking system with a central control circuit for the operation of closure actuating elements in both a releasing and a locking direction, the central control circuit being activated to operate the closure actuating elements by a locking or release control signal from a locking station assigned to a specific closure via a switch means that is coupled to this locking station and operated during each actuation of the locking station in both a releasing and a locking direction;

said coupling obtained through a control line, subjected to an electrical potential according to the direction of actuation of the switch means;

the switch means being mechanically coupled to the locking station to be operated upon actuation of the locking station;

a pulse counter provided in a part of the control line and subject to an electrical potential when either the locking station or the switch means is actuated in a releasing direction;

said pulse counter counting switch signals of the switch means occurring in the part control line and transmitting a release control signal to the central control circuit via another part of the control line only in response to a number of switch signals of the switch means when said number is generated within a predetermined time interval in said pulse counter.

9. Central locking system according to claim 7, wherein the predetermined time interval is obtained in a timing circuit in the pulse counter which is triggered by a first switch signal from the switch means to the pulse counter via a counting line input to preset the time interval in the pulse counter.

10. Central locking system according to claim 8, wherein the predetermined time interval is obtained in a timing circuit in the pulse counter which is triggered by a first switch signal from the switch means to the pulse counter via a counting line input to preset the time interval in the pulse counter.

11. Central locking system according to claim 7, wherein the pulse counter has a reset input, connected to the switch means;

said pulse counter during the actuation of the locking station in the locking direction, being reset to an initial state by the switch means through the reset input.

12. Central locking system according to claim 8, wherein the pulse counter has a reset input, connected to the switch means;

said pulse counter during the actuation of the locking station in the locking direction, being reset to an initial state by the switch means through the reset input.

13. Central locking system according to claim 9, wherein, after the expiration of the predetermined time interval, the timing circuit generates a signal resetting the pulse counter to an initial state.

14. Central locking system according to claim 10, wherein, after the expiration of the predetermined time interval, the timing circuit generates a signal resetting the pulse counter to an initial state.

* * * * *